US007289437B2

(12) United States Patent
Chiruvolu (10) Patent No.: US 7,289,437 B2
(45) Date of Patent: Oct. 30, 2007

(54) SYSTEM AND METHOD FOR ROUTING STABILITY-BASED INTEGRATED TRAFFIC ENGINEERING FOR GMPLS OPTICAL NETWORKS

(75) Inventor: Girish Chiruvolu, Richardson, TX (US)

(73) Assignee: Alcatel Lucent, Paris (FR)

( * ) Notice: Subject to any disclaimer, the term of this patent is extended or adjusted under 35 U.S.C. 154(b) by 1064 days.

(21) Appl. No.: 10/179,582

(22) Filed: Jun. 24, 2002

(65) Prior Publication Data

US 2003/0067880 A1    Apr. 10, 2003

Related U.S. Application Data

(60) Provisional application No. 60/328,087, filed on Oct. 10, 2001.

(51) Int. Cl.
| H04L 12/56 | (2006.01) |
| H04L 12/26 | (2006.01) |
| H04L 12/28 | (2006.01) |
| H04J 14/00 | (2006.01) |
| G06F 15/173 | (2006.01) |

(52) U.S. Cl. ............... 370/228; 370/237; 370/254; 370/392; 370/395.21; 709/239; 709/240; 398/5; 398/58; 714/4

(58) Field of Classification Search .......... 370/228, 370/237, 254, 392, 395.21; 709/239, 240; 398/5, 58; 714/4
See application file for complete search history.

(56) References Cited

U.S. PATENT DOCUMENTS 6,671,256 B1 * 12/2003 Xiong et al. ............... 370/230

6,950,398 B2 * 9/2005 Guo et al. ............... 370/235
2002/0018269 A1 * 2/2002 Chaudhuri et al. ......... 359/165

FOREIGN PATENT DOCUMENTS

| EP | 1083696 A | 3/2001 |
| WO | 0105083 A | 1/2001 |

OTHER PUBLICATIONS

Braden, et al.; Resource ReSerVation Protocol (RSVP)—Version 1 Functional Specification; IETF Network Working Group; RFC 2205; Sep. 1997.

(Continued)

*Primary Examiner*—Alpus H. Hsu
(74) *Attorney, Agent, or Firm*—Danamraj & Emanuelson; Jessica W. Smith (57) ABSTRACT

A system and method of implementing Routing Stability-Based Integrated Traffic Engineering ("RITE") for use in an MPLS/optical network is described. Incoming network traffic is classified as high priority ("HP"), which requires absolute routing stability, or low priority ("LP"), which can tolerate limited rerouting. In accordance with one embodiment, HP traffic trunks are mapped on to direct LCs and are rerouted only in the event of an LC teardown due to poor traffic utilization. LP traffic trunks are mapped on to direct LCs if available; otherwise, they are mapped on to multi-hop LSPs with appropriate O/E/O conversions at the edge nodes serving as intermediate hops. Each LP traffic trunk is associated with a rerouting timer that is set at the time of rerouting so as to prevent another rerouting of the trunk until the timer expires.

24 Claims, 4 Drawing Sheets

OTHER PUBLICATIONS

S. Herzug; RSVP Extensions for Policy Control; IETF Network Working Group; RFC 2750 (updates RFC 2205); Jan. 2000.

Mannie, et al.; Generalized Multi-Protocol Label Switching (GMPLS) Architecture; IETF Network Working Group; Mar. 2002.

Berger, et al.; Generalized MPLS Signalling—RSVP-TE Extensions; IEFT Network Working Group; Apr. 2002.

Ashwood-Smith, et al.; Generalized MPLS Signaling—CR-LDP Extensions; IETF Network Working Group; Apr. 2002.

Ashwood-Smith, et al.; Generalized MPLS—Signaling Functional Description; IETF Network Working Group; Jul. 2001.

Lovanna P et al., "A Traffic Engineering System for Multilayer Networks Based on the GMPLS Paradigm", IEEE Network, IEEE Service Center, New York, NY, US, vol. 17, No. 2, Mar. 2003, pp. 28-37, XP001149575, ISSN: 0890-8044.

Awduche D, et al, "Multiprotocol LAMBDA Switching: Combining MPLS Traffic Engineering Control with Optical Crossconnects", IEEE Communications Magazine, IEEE Service Center, New York, NY, US, vol. 39, No. 3, Mar. 2001, pp. 111-116, XP001059336, ISSN: 0163-6804.

Kumar M S et al., "Lightpath Setup Time Optimization in Wavelength Routed All-Optical Networks" Computers Communications, Elsevier Science Publishers BV, Amsterdam, NL, vol. 24, No. 10, May 16, 2001, pp. 984-995, XP004240648, ISSN: 0140-3664.

Awduche D, et al, "Requirements for Traffic Engineering Over MPLS (RFC 2702)", Network Working Group, Sep. 1999, XP002185031.

\* cited by examiner

|  | Node 102a | Node 102b | Node 102c |
|---|---|---|---|
| Node 102a |  | preferred_hops[Node 102b][Node 102b] | preferred_hops[Node 102a][Node 102c] |
| Node 102b | preferred_hops[Node 102b][Node 102a] |  | preferred_hops[Node 102c][Node 102c] |
| Node 102c | preferred_hops[Node 102c][Node 102a] | preferred_hops[Node 102c][Node 102b] |  |

|  | Node 102a | Node 102b | Node 102c | OXC 104a | OXC 104b | OXC 104c |
|---|---|---|---|---|---|---|
| Node 102a |  |  |  | w_a[Node 102a][OXC 104a] | w_a[Node 102a][OXC 104b] | w_a[Node 102a][OXC 104c] |
| Node 102b |  |  |  | w_a[Node 102b][OXC 104a] | w_a[Node 102b][OXC 104b] | w_a[Node 102b][OXC 104c] |
| Node 102c |  |  |  | w_a[Node 102c][OXC 104a] | w_a[Node 102c][OXC 104b] | w_a[Node 102c][OXC 104c] |
| OXC 104a | w_a[OXC 104a][Node 102a] |  |  |  | w_a[OXC 104a][OXC 104b] | w_a[OXC 104a][OXC 104c] |
| OXC 104b |  | w_a[OXC 104b][Node 102b] |  | w_a[OXC 104b][OXC 104a] |  | w_a[OXC 104b][OXC 104c] |
| OXC 104c |  |  | w_a[OXC 104c][Node 102c] | w_a[OXC 104c][OXC 104a] | w_a[OXC 104c][OXC 104b] |  |

SYSTEM AND METHOD FOR ROUTING STABILITY-BASED INTEGRATED TRAFFIC ENGINEERING FOR GMPLS OPTICAL NETWORKS

PRIORITY UNDER 35 U.S.C. §119(e) & 37 C.F.R. §1.78

This nonprovisional application claims priority based upon the following prior U.S. provisional patent application entitled: INFORMED DYNAMIC SHARED PATH PROTECTION, Provisional Application No. 60/328,087, filed Oct. 10, 2001, which is hereby incorporated by reference for all purposes.

BACKGROUND OF THE INVENTION

1. Technical Field of the Invention

The present invention generally relates to optical networks. More particularly, and not by way of any limitation, the present invention is directed to a system and method for routing stability-based integrated traffic engineering ("RITE") for a Generalized Multi-Protocol Label Switching ("GMPLS") network.

2. Description of Related Art

GMPLS optical networks generally include a plurality of edge nodes, comprising MPLS routers, that have appropriate opto-electrical interfaces for converting incoming electrical signals to optical signals (E/O interfaces) at an "ingress node" and for converting optical signals to electrical signals (O/E interfaces) at an "egress node". Traffic is routed between an ingress and egress node pair via optical cross connects ("OXCs") located throughout the network. OXCs are nodes that lack any sort of electrical capability; they simply route optical signals from one node to another. A light channel ("LC"), or Label Switched Path ("LSP"), is an optical communications channel from an ingress node to an egress node via one or more intermediate nodes, which may comprise OXCs as well as edge nodes, in some cases.

High-priority ("HP") and low-priority ("LP") traffic trunks are characterized by the start and end times of their active resource utilization, also known as "lifetimes". HP traffic trunks need absolute routing stability. In contrast, LP traffic trunks may be rerouted; that is, traffic may be transported between an ingress/egress node pair via an LC on which it was not originally mapped. Rerouting stability is a measure of how many times a traffic trunk is rerouted in its lifetime. Lifetimes of traffic trunks are measured in time units (e.g., seconds, minutes), and are typically drawn from a probabilistic distribution.

A direct LC is an LC that is established between an ingress/egress node pair that constitutes only a single LC. In contrast, a multi-hop LSP constitutes one or more edge nodes as intermediate termination points of the LCs and may comprise multiple wavelengths. The traffic undergoes O/E/O conversion at the intermediate edge nodes. HP and LP requests are requests for bandwidth allocation and appropriate mapping on the LCs for HP and LP traffic trunks, respectively. Mapping could be on existing, or established, LCs or on new LCs that are established dynamically.

Static provisioning of light channels in a GMPLS optical network is generally cumbersome and time-consuming and often leads to underutilization of resources if traffic demands within the network vary with time. In order to adapt to the changing traffic demands for optimal resource utilization, schemes that dynamically establish and teardown optical channels are highly desirable. However, this "make-and-break" of optical channels often results in the rerouting of existing traffic that can lead to better utilization of resources. Rerouting for individual traffic trunks can affect many relevant quality of service ("QoS") measures, such as delay and jitter, and may lead to degradation of throughput. For example, Transmission Control Protocol ("TCP") applications that do not have large buffers for reordering of the out-of-sequence packets may trigger retransmission of many packets. Delay and jitter are critical to real-time applications and also get affected as a result of rerouting of traffic trunks. In the case of non-packet-based Time Division Multiplex ("TDM") signals, rerouting may translate into disruption of ongoing signals. Traffic Engineering ("TE") procedures should address these issues in the context of dynamic wavelength assignment and traffic mapping in order to make optimal use of the optical resources.

Currently, only general TE frameworks for GMPLS in optical networks have been proposed. No solutions currently exist that address the above-noted TE issues with respect to rerouting of traffic.

SUMMARY OF THE INVENTION

One embodiment of a Routing Stability-Based Integrated Traffic Engineering ("RITE") method described herein is directed toward a GMPLS/optical network in which the edge (i.e., ingress and egress) nodes comprise MPLS routers that are interconnected by an optical network that imposes wavelength continuity constraints across the end points (i.e., the MPLS routers). Light Channels ("LCs"), or Label Switched Paths ("LSPs"), are established on demand depending on the traffic loads at the MPLS routers. The goal of the RITE method is to increase utilization of existing/ established LCs carrying maximum traffic, while conservatively establishing new LCs and minimizing the frequency with which traffic trunks are rerouted during their lifetime, which is defined as the time period between the establishment and subsequent tear down of the LC at the ingress node. LCs that are underutilized are torn down, thereby freeing up the relevant optical resources (e.g., wavelengths), and new LCs are established responsive to incoming traffic demands. Incoming traffic is classified as high priority ("HP"), which requires absolute routing stability, or low priority ("LP"), which can tolerate QoS degradation due to limited rerouting but subject to a limit on the frequency of the rerouting.

In accordance with one embodiment, HP traffic trunks are mapped on to direct LCs that connect a designated pair of ingress and egress nodes and are rerouted only in the event of an LC/LSP teardown due to poor traffic utilization. LP traffic trunks are mapped on to direct LCs if available; otherwise, they are mapped on to LSPs that span multiple LCs with appropriate O/E and E/O conversions at the edge nodes serving as intermediate hops. The O-E-O conversions at the intermediate nodes may introduce packet delays for the traffic mapped on to multi-hop LSPs. Each such LP traffic trunk is associated with a rerouting timer that is set at the time of rerouting so as to prevent another rerouting of the trunk until the timer expires. The policy of the, RITE method described herein is to accommodate HP traffic on the existing LCs and reroute existing LP traffic trunks to multi-hop LCs as necessary to free up bandwidth on direct LCs for HP traffic.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

In the drawings, like or similar elements are designated with identical reference numerals throughout the several views thereof, and the various elements depicted are not necessarily drawn to scale.

Figure 1:
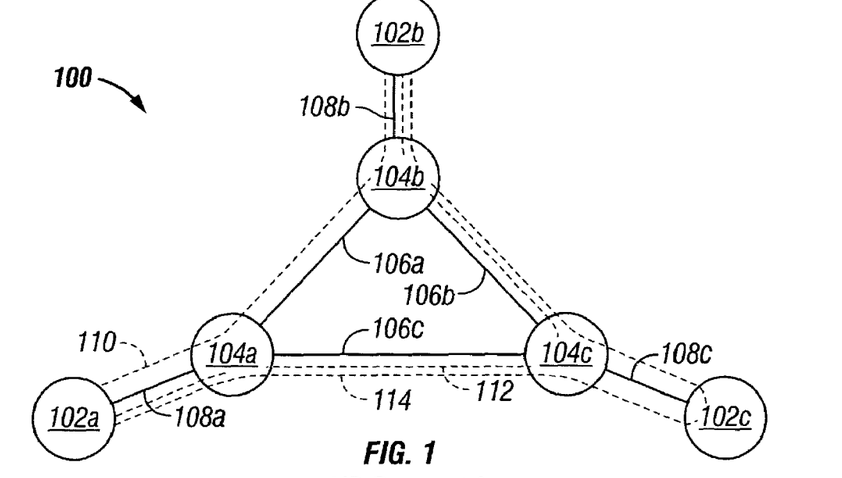
FIG. 1 is a block diagram of a GMPLS/optical network in which features of one embodiment of a Routing-Stability Based Integrated Traffic Engineering ("RITE") method may be implemented.

FIG. 1 depicts a simplified exemplary GMPLS optical network 100 comprising three MPLS, or edge, nodes 102a, 102b, and 102c, and three optical cross-connects ("OXCs") 104a, 104b, and 104c. As previously noted, OXCs, such as the OXCs 104a, 104b, and 104c, merely carry and switch light signals; they do not have O/E or E/O conversion capability. In contrast, the MPLS edge nodes (e.g., nodes 102a, 102b, and 102c) do have such conversion capability. OXCs 104a, 104b, and 104c are interconnected via links 106a, 106b, and 106c. Node 102a is connected to OXC 104a via a link 108a, node 102b is connected to OXC 104b via a link 108b, and node 102c is connected to OXC 104c via a link 108c.

As illustrated in FIG. 1, requests for bandwidth are received by the edge nodes 104a, 104b, and 104c. Each request is of a fixed size (e.g., 10 Mbits/second) and each of the LCs to be established carries a certain number of frequencies, so each LC can accommodate a fixed number (e.g., 10) of requests. Requests are classified into high priority ("HP") and low priority ("LP") requests according to the class of traffic the corresponding traffic trunks will be carrying. HP traffic requires absolute routing stability (i.e., no rerouting); in contrast, LP traffic can tolerate QoS degradation due to limited rerouting.

A direct LC, or LSP, is one that comprises a direct optical connection between an ingress/egress node pair via one or more OXCs. In contrast, a multi-hop LC, or LSP, is one that constitutes more than one LC and hence comprises an optical connection between an ingress/egress node pair via one or more OXCs and one or more edge nodes other than the ingress and egress nodes. For example, referring to FIG. 1, assuming that a bandwidth request is received at the node 102a to establish an LC between the node 102a (designated the ingress node) and the node 102b (designated the egress node), one example of a direct LC between the nodes is represented by a path 110. As illustrated in FIG. 1, the path 110 comprises the links 108a, 106a, and 108b and includes the ingress node (node 102a), OXC 104a, OXC 104b, and the egress node (node 102b). It will be recognized that multiple direct LCs may exist for the same ingress/egress node pair. For example, a path 112 from the node 102a to the node 102b via the links 108a, 106c, 106b, and 108b, and including OXC 104a, OXC 104c, and OXC 104b, also constitutes a direct LC for the ingress/egress node pair. In contrast, a path 114, which includes the links 108a, 106c, 108c, 106b, and 108b, as well as node 102c and OXCs 104a, 104c, and 104b, represents a multi-hop LC for the ingress/egress node pair (nodes 102a and 102b).

Figure 2:
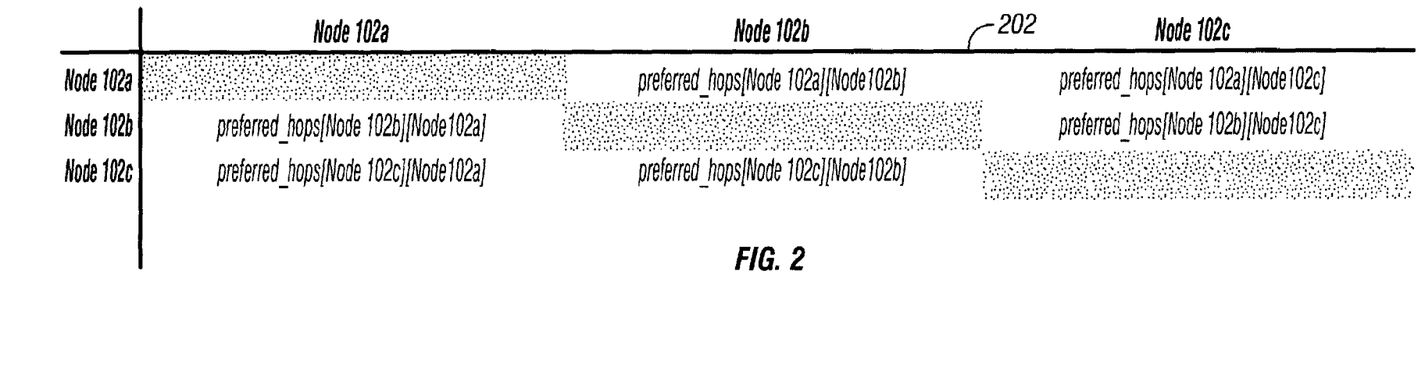
FIG. 2 depicts a Preferred Hops table of one embodiment of the RITE method of the present invention.
Figure 3:
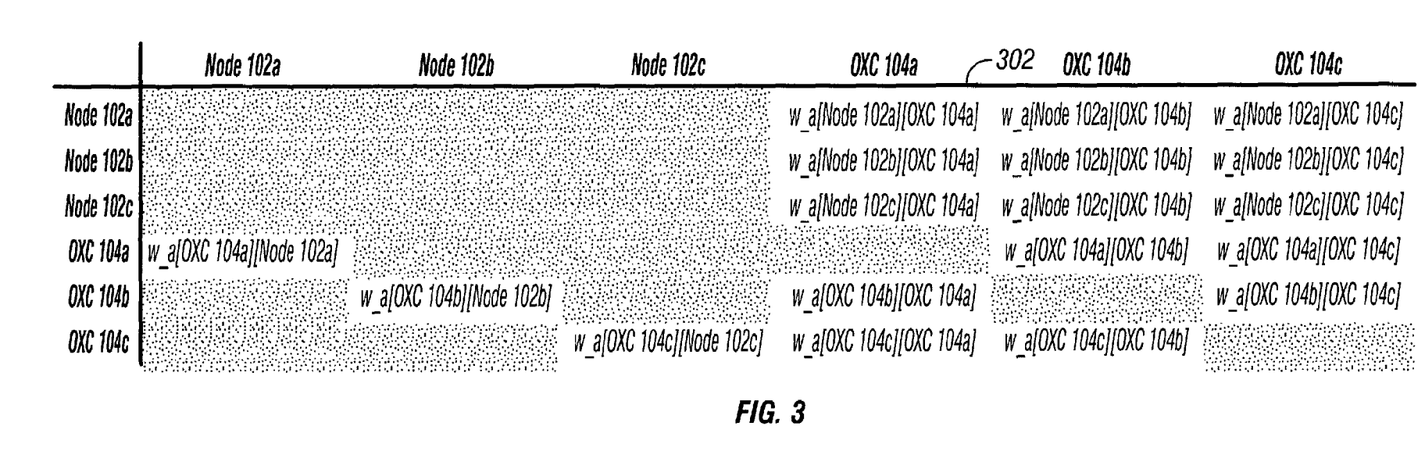
FIG. 3 depicts a Wavelengths Available table of one embodiment of the RITE method of the present invention.

For purposes that will be described in greater detail below, each edge node 102a, 102b, and 102c maintains two tables, including a Preferred Hops table 200 (FIG. 2) and a Wavelengths Available table 300 (FIG. 3). A description of each table, with specific reference to the network 100, follows.

The Preferred Hops table 200 is a two-dimensional array/table indexed on the edge nodes only. The table 200 is updated whenever relevant Link State Advertisements ("LSAs"), such as LC establishment or over- or underutilization notifications are received. For example, when a new LC is established between the edge nodes i, j, where "i" designates the ingress node and "j" designates the egress node, then the corresponding entry ("preferred_hops[i] [j]") of the Preferred Hops table 200 is incremented by one, indicating the availability of an additional LC between the nodes. If no LC exists between the edge nodes i, j, then the corresponding entry is set to zero. Whenever utilization of an LC crosses an upper threshold, the corresponding entry of the table is decremented by one upon receipt of the LSA. Similarly, when an LC is torn down, the corresponding entry of the table is decremented by one.

Thus, each entry preferred_hops[i] [j] of the Preferred Hops table 200 indicates the number of direct LCs that exist between the ingress/egress node pair comprising the nodes i, j, that have spare capacity. For example, an entry 202 ("preferred_hops[node 102a] [node 102b]") indicates the number of direct LCs between nodes 102a and 102b. For a multi-hop LSP, the Preferred Hops table 200 is consulted Dijkstra's algorithm is used to computer the shortest path between the given nodes. Specifically, as will be recognized by those of ordinary skill in the art, each of the links carries a "weight/metric" that can be chosen based on specific requirements. For example, if each of the links is characterized by distance in miles, then running Dijkstra's algorithm provides the sequence of nodes and the links to be followed to get from the source node to the destination node wherein the total route length is minimum. In the present embodiment, using the RITE method, the metric is selected to be the number of wavelengths/LCs available on a fiber link, resulting in a greater chance of finding a single wavelength, or LC, from one edge node (source) to another edge node (destination).

The Wavelengths Available table 300 is also a two-dimensional array, but it is indexed by all the nodes, including OXCs as well as the edge nodes. Each entry of the table ("w_a[k] [l]") indicates the number of wavelengths, or channels, available at the node on the link from node k to node l. For example, an entry 302 ("w_a[node 102a] [OXC 104a]") indicates the number of available wavelengths on the link 108a between node 102a and OXC 104a. It will be noted that no entries exist for node pairs between which there is no direct link (e.g., nodes 102a and 102b).

The table 300 is updated whenever an LSA corresponding to an LC establishment or teardown is received. The Wavelengths Available table 300 is consulted in determining a route across the OXCs for the establishment of direct-LCs between a designated pair of edge nodes. The table 300 may be augmented with parameters such as distance or propagation time between any two nodes that are connected by direct links and appropriate transformations that can be done so as to run Dijkstra's algorithm to determine the shortest path, as described above.

Figure 4:
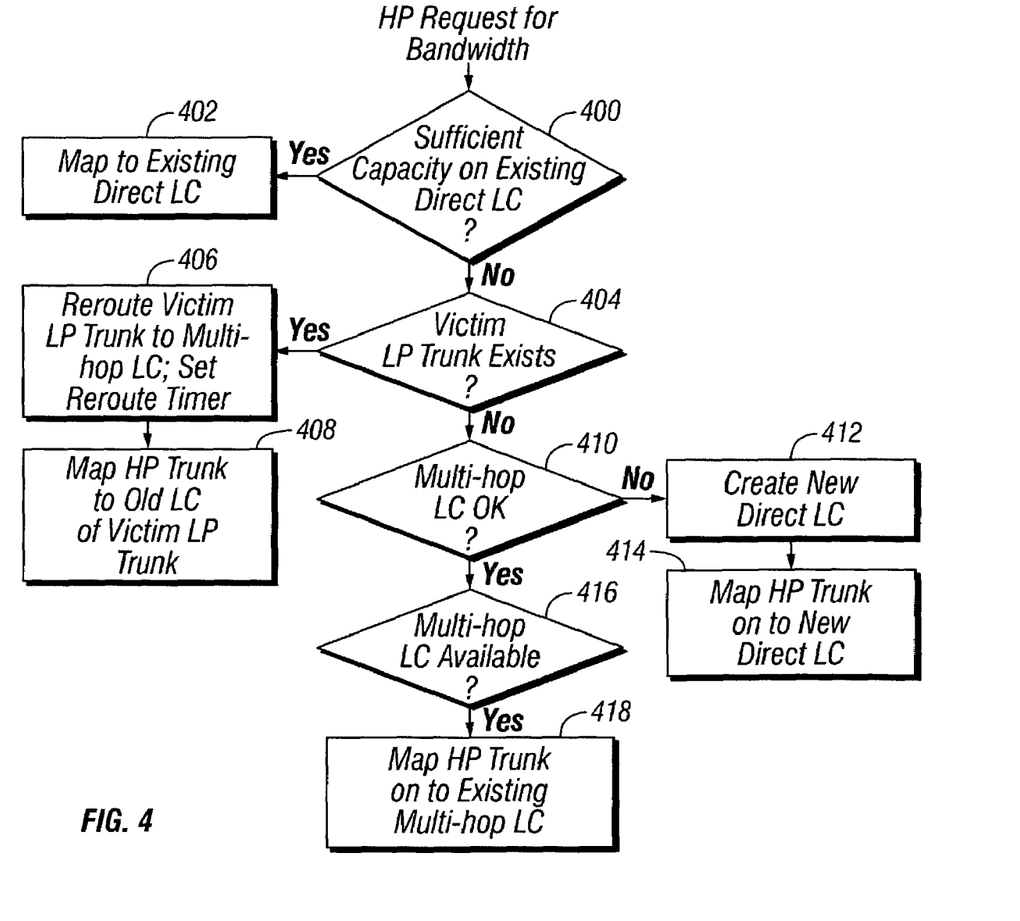
FIGS. 4 and 5 depict flowcharts illustrating of the operation of one embodiment of the RITE method of the present invention.

FIG. 4 is a flowchart of the operation of one embodiment of the RITE method of the present invention. In step 400, responsive to receipt of a HP request for bandwidth for an HP traffic trunk between a designated ingress/egress node pair, a determination is made whether capacity exists on a direct LC between the designated ingress/egress node pair. If so, execution proceeds to step 402 in which the HP traffic trunk corresponding to the HP request is mapped to the existing direct LC. Otherwise, execution proceeds to step 404. In step 404, a determination is made whether a victim LP traffic trunk on the direct LC between the ingress/egress node pair is available for rerouting to another LC. To be eligible for rerouting, an LP traffic trunk must not have been rerouted within the predetermined preceding time period; in other words, its reroute timer must be expired. If an eligible victim LP traffic trunk is found, execution proceeds to step 406, in which the victim LP traffic trunk is rerouted to a multi-hop LC and the reroute timer for the LP traffic trunk is set, so that it cannot be re-rerouted until the timer expires (e.g., one hour). Execution then proceeds to step 408, in which the HP traffic trunk is mapped on to the direct LC on to which the victim LP traffic trunk was previously mapped.

If in step 404, a victim LP was not found to be available, execution proceeds to step 410, in which a determination is made whether it is permissible for the HP traffic trunk corresponding to the HP request to be mapped on to a multi-hop LC. This will be the case if the HP class does not impose constraints that make the delay due to O-E-O conversions inherent in a multi-hop LC intolerable. It will be recognized that HP trunks mapped on to multi-hop LCs stand a greater risk of rerouting due to tear down of any one of the underlying direct LCs due to underutilization. Generally, it will be presumed that HP trunks must be mapped to direct LCs. If it is determined that it is not permissible for the HP traffic trunk corresponding to the received HP request to be mapped on to a multi-hop LC, as would generally be the case, execution proceeds to step 412, in which a new direct LC is created, and then to step 414, in which the HP traffic trunk is mapped on to the newly-created direct LC.

Assuming, however, that it is not impermissible for the HP traffic trunk to be mapped on to a multi-hop LC, execution proceeds from step 410 to step 416, in which the existing multi-hop LCs between the ingress/egress node pair are checked to determine whether sufficient capacity exists on any one of them. If so, execution proceeds to step 418, in which the HP traffic trunk is mapped to the existing multi-hop LC. If not, execution proceeds to step 412 (described above).

Figure 5:
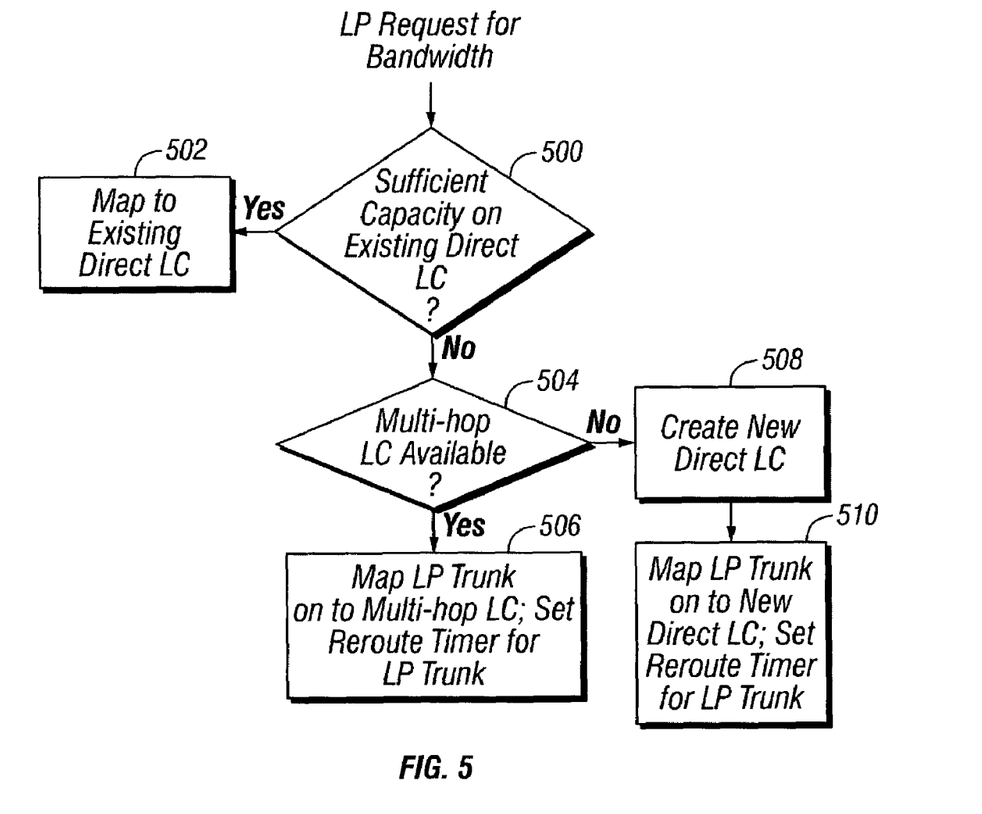
Figure 6:
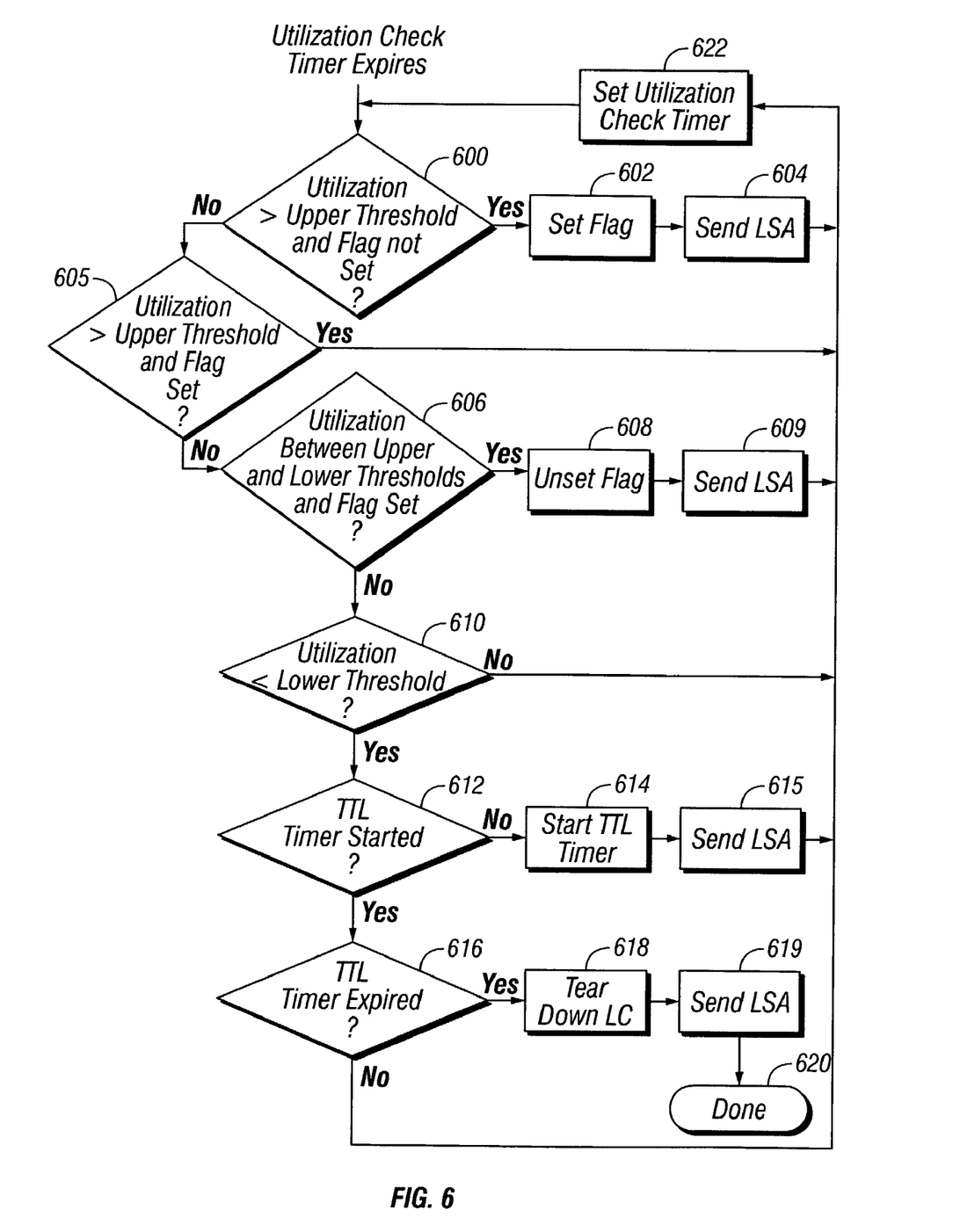
FIG. 6 depicts a flowchart of a method of monitoring the utilization of each established LC of an optical network in accordance with one embodiment of the RITE method of the present invention.

Requests for bandwidth for HP and LP class traffic trunks (respectively referred to as HP requests and LP requests) arrive at the ingress edge nodes. FIGS. 5 and 6 respectively depict flowcharts illustrating the mapping of HP and LP requests/trunks on to LCs in accordance with the RITE method of one embodiment. In particular, referring to FIG. 5, responsive to receipt of an LP request for bandwidth for an LP traffic trunk between a designated ingress/egress node pair, in step 500 a determination is made whether capacity exists on a direct LC between the designated ingress/egress node pair. If so, execution proceeds to step 502 in which the HP traffic trunk corresponding to the HP request is mapped to the existing direct LC. Otherwise, execution proceeds to step 504. In step 504, a determination is made whether a multi-hop LC is available on to which to map the LC traffic trunk. In this step, the Preferred Hops table is consulted to compute a feasible path for a multi-hop LSP between the designated ingress/egress node pair. If a multi-hop LC is available, execution proceeds to step 506, in which the LP trunk is mapped on to the multi-hop LC and the reroute timer for the LP trunk is set. In contrast, if a multi-hop LC establishment fails, e.g., due to lack of bandwidth or available direct LCs, execution proceeds to step 508, in which a new direct LC is created, and then to step 510, in which the LP trunk is mapped on to the newly created direct LC and the reroute timer for the LP trunk is set.

FIG. 6 depicts a flowchart illustrating a method of monitoring the utilization of each established LC of an optical network in accordance with one embodiment. The method illustrated in FIG. 6 is performed at each ingress node for each established LC. Execution begins in step 600, responsive to expiration of a utilization check timer for the LC, which defines the periodicity with which each LC is checked for utilization. In step 600, a determination is made whether utilization of the LC is above an upper threshold, indicating that the LC is over-utilized, and a monitoring flag is not set. If so, execution proceeds to step 602, in which the monitoring flag is set, and then to step 604, in which an appropriate LSA is sent to all of the edge nodes advising of the fact that the utilization of the LC has exceeded the upper threshold. Upon receipt of the LSA sent in step 604, the edge nodes update their respective Preferred Hops tables appropriately. Specifically, in each table, the entry corresponding to the LC is decremented by one.

If a negative determination is made in step 600, execution proceeds to step 605, in which a determination is made whether utilization of the LC is above an upper threshold, indicating that the LC is over-utilized, and a monitoring flag is set. If not, execution proceeds to step 606, in which a determination is made whether the utilization is between upper and lower thresholds and the monitoring flag is set.

If both conditions are met in step 606, indicating that the utilization of the LC had previously exceeded the upper threshold (as indicated by the fact that the monitoring flag is set), but has fallen back below the upper threshold, but not below the lower threshold, execution proceeds to step 608, in which the monitoring flag is unset, and then to step 609. In step 609, an appropriate LSA is sent to all of the edge nodes advising of the fact that the utilization of the LC has returned to within acceptable limits. Upon receipt of the LSA sent in step 609, the edge nodes update their respective Preferred Hops tables appropriately. Specifically, at each table, the entry corresponding to the LC is incremented by one. It should be noted that the utilization can be averaged over longer intervals so that oscillations around the upper threshold can be reduced.

If a negative determination is made in step 606, execution proceeds to step 610. In step 610, a determination is made whether utilization is below a lower threshold, indicating that the LC is underutilized. If so, execution proceeds to step 612. In step 612, a determination is made whether a time-to-live ("TTL") timer has been started. The TTL timer indicates the remaining time an LC can remain underutilized before it is torn down. If in step 612 it is determined that the TTL timer has not been started, execution proceeds to step 614, in which the timer is started, and then to step 615, in which an appropriate LSA is sent to all of the edge nodes advising of the fact that the TTL timer for the LC has been started. Upon receipt of the LSA sent in step 615, the edge nodes attempt to reroute their traffic trunks on to other LCs before the TTL timer expires. If a positive determination is made in step 612, execution proceeds to step 616.

In step 616, a determination is made whether the TTL timer has expired. If so, execution proceeds to step 618, in which the LC is torn down, and then to step 619, in which an appropriate LSA is sent to all of the edge nodes advising of the fact that the LC has been torn down. Upon receipt of the LSA sent in step 619, the edge nodes update their respective Preferred Hops tables appropriately. Specifically, at each table, the entry corresponding to the LC is decremented by one. Execution ends in step 620.

Subsequent to execution of any one of steps 604, 609, or 615, or responsive to a negative determination in steps 610 or 616 or a positive determination in step 605, execution proceeds to step 622, in which the utilization check timer is reset, and then awaits expiration of the utilization check timer before returning to step 600.

Figure 7:
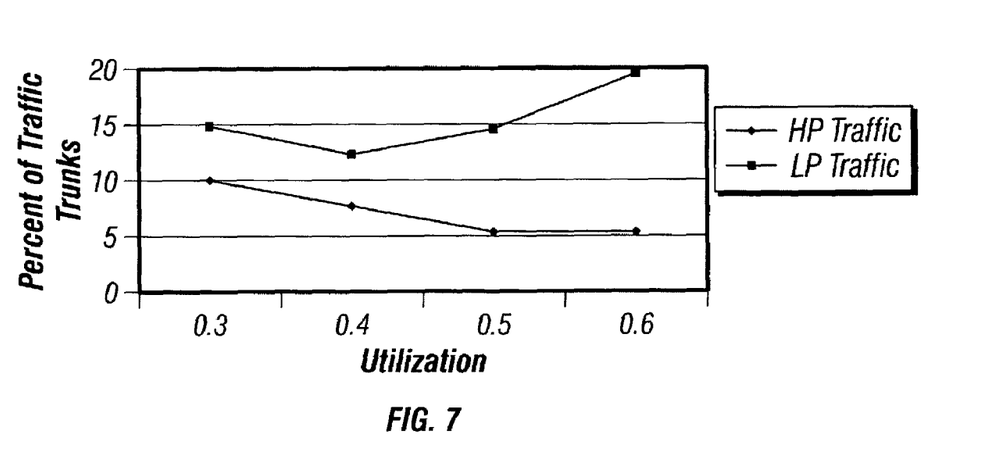
FIG. 7 depicts the results of a simple simulation performed as an evaluation of the RITE method described herein.

FIG. 7 depicts the results of a simple simulation performed using an arrangement equivalent to the network 100 as an evaluation of the RITE method described herein. For simulation purposes, each of the links 106a–106c, 108a–108c is a Wavelength Division Multiplexed ("WDM") link with eight wavelengths. The simulation has been implemented with a network simulator known as ns-2, version beta-8, by extending the existing LDP to carry optical resources (probe packets) information for LC set-up using First Fit (available wavelength along the path OXCs), teardown and LSP mapping of traffic trunks. HP/LP requests and their lifetimes are generated according to exponential capacity (mean parameter varied). Each of the LCs can accommodate 15 discrete HP/LP requests (capacity/granularity of BW requests identical). The upper and lower thresholds are respectively selected as 80% and 20% of an LC bandwidth. The reroute timer is set to five time units, which is approximately 30% of the average LC lifetimes, and the utilization timer is set to ten time units. "Widest Path" (with largest available bandwidth per wavelength) is employed for finding explicit paths.

FIG. 7 illustrates the effective routing stability provided for HP traffic, while the rerouting frequency for LP traffic is bounded with in 20% during their lifetimes, which are exponentially distributed. When the utilization of an LC is low, thereby triggering the teardown of the LC, some of the HP traffic is also rerouted and mapped on to multi-hop LSPs. For the LP traffic, as the utilization factor increases, the probability of rerouting the LP trunks to make way for HP trunks of direct LCs increases. This demonstrates the feasibility of achieving routing stability under the abovementioned criteria and, as a result, improving QoS measures such as throughput, delay, and jitter and minimizing the service signal disruption for the ongoing sessions.

In general, if the distinction (HP vs. LP) between the classes is ignored, the reroute timer mechanism can still serve as a simple but efficient policy to provide routing stability. Constraints such as propagation delay and queuing delay for multi-hop LSPs can augment the path selection process. Traffic prediction can be taken into account while attempting to establish new LCs. A new class of traffic can be introduced such that an LC that is established and on to which traffic of such class is mapped will not be torn down even in the case of poor utilization until the LC is left without any class of traffic mapped thereon.

Based upon the foregoing Detailed Description, it should be readily apparent that the present invention advantageously provides a simple method of providing integrated TE resource management (both bandwidth and wavelengths) and provides the routing stability to the desired classes of traffic. Further, service differentiation can be introduced by having different reroute timers for each class of traffic.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of rerouting traffic in an optical Multi-Protocol Label Switching ("MPLS") network, wherein Label Switched Paths ("LSPs") are established over a plurality of optical links between nodes of the network, the method comprising the steps of:
   upon establishment of an LSP, setting a reroute for a predetermined time period, wherein the LSP is prevented from being rerouted prior to expiration of the predetermined time period;
   for each optical link of the network:
      periodically monitoring the optical link to determine bandwidth utilization thereon; and
      responsive to a determination that bandwidth utilization on the optical link is below a lower threshold, rerouting an LSP on the optical link to another optical link if the predetermined time period for the LSP has expired.

2. The method of claim 1 further comprising the step of, for each optical link of the network, responsive to a determination that bandwidth utilization on the optical link is below a lower threshold, subsequent to rerouting of the LSP on the optical link to another optical link, tearing down the optical link from which the LSP is rerouted if the bandwidth utilization on the optical link has remained below the lower threshold for a predetermined time-to-live time period.

3. The method of claim 2 further comprising the step of, for each optical link of the network, responsive to the step of tearing down the optical link, issuing a Link State Advertisement ("LSA") in connection with the optical link to at least one node of the network.

4. The method of claim 1 further comprising the step of, for each optical link of the network:
   responsive to a determination that bandwidth utilization on the optical link is above an upper threshold and that a monitoring flag is not set, setting the monitoring flag and issuing a Link State Advertisement ("LSA") in connection with the optical link to at least one node of the network.

5. The method of claim 1 further comprising the step of, for each optical link of the network:
   responsive to a determination that bandwidth utilization on the optical link is between an upper threshold and a lower threshold and that a monitoring flag is set, unsetting the monitoring flag and issuing a Link State Advertisement ("LSA") in connection with the optical link to at least one node of the network.

6. The method of claim 3 wherein the LSA indicates to the at least one node of the network the state of the optical link in connection with which it is sent.

7. The method of claim 1 further comprising the step of, at each edge node, responsive to receipt of a Link State Advertisement ("LSA"), the edge node updates the preferred hops table maintained thereby.

8. The method of claim 1 further comprising the step of, at each node of the network, responsive to receipt of a Link State Advertisement ("LSA"), the node updating a wavelengths available table maintained thereby.

9. A method of scheduling Label Switched Paths ("LSPs") in an optical Multi-Protocol Label Switching ("MPLS") network comprising the steps of:

maintaining at each edge node of the network a preferred hop table indicating established LSPs in the network and bandwidth utilization of each established LSP;

receiving a request for bandwidth for a traffic trunk from an ingress edge node to an egress edge node wherein the request and associated traffic trunk are categorized as either high priority or low priority;

if the request is high priority;

assigning to the high priority request an existing direct LSP that has available bandwidth;

if no existing direct LSP has available bandwidth, rerouting a low priority traffic trunk from an existing direct LSP to a multi-hop LSP, assigning the traffic trunk associated with the high priority request to the existing direct LSP, and setting a reroute timer associated with the rerouted low priority traffic trunk to expire after a first predetermined time period, wherein the rerouted low priority traffic trunk is prevented from being rerouted again until expiration of the associated reroute timer;

if no existing direct LSP has available bandwidth and a low priority traffic trunk cannot be rerouted from an existing direct LSP, establishing a new direct LSP between the ingress and egress edge nodes and assigning the new direct LSP to the traffic trunk associated with the high priority request; and for each LSP of the network, periodically monitoring the LSP to determine bandwidth utilization thereof and updating an entry corresponding to the LSP at each preferred hop table responsive to the monitoring.

10. The method of claim 9 further comprising, if the request is low priority:

assigning to the low priority request an existing direct LSP that has available bandwidth;

if no existing direct LSP has available bandwidth, assigning to the traffic trunk associated with the low priority request a multi-hop LSP that has available bandwidth; and responsive to assignment of an LSP to the traffic trunk associated with the low priority request, setting a reroute timer associated with the traffic trunk associated with the low priority request to expire after a first predetermined time period, wherein the traffic trunk associated with the low priority request is prevented from being rerouted again until expiration of the associated reroute timer.

11. The method of claim 10 further comprising the step of, if the request is low priority:

if no multi-hop LSP has available bandwidth, establishing a new direct LSP between the ingress and egress edge nodes and assigning the new direct LSP to the traffic trunk associated with the low priority request.

12. The method of claim 9 further comprising the step of, if the request is high priority:

if no existing direct LSP has available bandwidth and a low priority traffic trunk cannot be rerouted from an existing direct LSP and it is acceptable for the traffic trunk associated with the high priority request to be assigned to a multi-hop LSP, assigning a multi-hop LSP to the traffic trunk associated with the high priority request.

13. A system for rerouting traffic in an optical Multi-Protocol Label Switching ("MPLS") network, wherein Label Switched Paths ("LSPs") are established over a plurality of optical links between nodes of the network, the system comprising:

means for setting a reroute timer for a predetermined time period upon establishment of an LSP, wherein the LSP is prevented from being rerouted prior to expiration of the predetermined time period;

for each optical link of the network:

means for periodically monitoring the optical link to determine bandwidth utilization thereon; and means responsive to a determination that bandwidth utilization on the optical link is below a lower threshold for rerouting an LSP on the optical link to another optical link if the predetermined time period for the LSP has expired.

14. The system of claim 13 further comprising, for each optical link of the network, means responsive to a determination that bandwidth utilization on the optical link is below a lower threshold, subsequent to rerouting of the LSP on the optical link to another optical link, for tearing down the optical link from which the LSP is rerouted if the bandwidth utilization on the optical link has remained below the lower threshold for a predetermined time-to-live time period.

15. The system of claim 14 further comprising, for each optical link of the network, means responsive to the step of tearing down the optical link for issuing a Link State Advertisement ("LSA") in connection with the optical link to at least one node of the network.

16. The system of claim 13 further comprising, for each optical link of the network:

means responsive to a determination that bandwidth utilization on the optical link is above an upper threshold and that a monitoring flag is not set for setting the monitoring flag and issuing a Link State Advertisement ("LSA") in connection with the optical link to at least one node of the network.

17. The system of claim 13 further comprising, for each optical link of the network:

means responsive to a determination that bandwidth utilization on the optical link is between an upper threshold and a lower threshold and that a monitoring flag is set for unsetting the monitoring flag and issuing a Link State Advertisement ("LSA") in connection with the optical link to at least one node of the network.

18. The system of claim 15 wherein the LSA indicates to the at least one node of the network the state of the optical link in connection with which it is sent.

19. The system of claim 13 further comprising, at each edge node, means responsive to receipt of a Link State Advertisement ("LSA") for causing the edge node to update the preferred hops table maintained thereby.

20. The system of claim 13 further comprising, at each node of the network, means responsive to receipt of a Link State Advertisement ("LSA") for causing the node to update a wavelengths available table maintained thereby.

21. A system for scheduling Label Switched Paths ("LSPs") in an optical Multi-Protocol Label Switching ("MPLS") network comprising:

a preferred hop table maintained at each edge node of the network, each preferred hop table indicating established LSPs in the network and bandwidth utilization of each established LSP;

means for categorizing each request for bandwidth for a traffic trunk from an ingress edge node to an egress edge node as either high priority or low priority;

means responsive to a high priority request for bandwidth for:
  assigning to the high priority request an existing direct LSP that has available bandwidth;
  if no existing direct LSP has available bandwidth, rerouting a low priority traffic trunk from an existing direct LSP to a multi-hop LSP, assigning the traffic trunk associated with the high priority request to the existing direct LSP, and setting a reroute timer associated with the rerouted low priority traffic trunk to expire after a first predetermined time period, wherein the rerouted low priority traffic trunk is prevented from being rerouted again until expiration of the associated reroute timer;
  if no existing direct LSP has available bandwidth and a low priority traffic trunk cannot be rerouted from an existing direct LSP, establishing a new direct LSP between the ingress and egress edge nodes and assigning the new direct LSP to the traffic trunk associated with the high priority request; and means for periodically monitoring each LSP of the network to determine bandwidth utilization thereof and updating an entry corresponding to the LSP at each preferred hop table responsive to the monitoring.

22. The system of claim 21 farther comprising, for each low priority bandwidth request:

means for assigning to the low priority request an existing direct LSP that has available bandwidth;

means for assigning to the traffic trunk associated with the low priority request a multi-hop LSP that has available bandwidth if no existing direct LSP has available bandwidth; and means responsive to assignment of an LSP to the traffic trunk associated with the low priority request for setting a reroute timer associated with the traffic trunk associated with the low priority request to expire after a first predetermined time period, wherein the traffic trunk associated with the low priority request is prevented from being rerouted again until expiration of the associated reroute timer.

23. The system of claim 22 farther comprising, for each low priority request:

means for establishing a new direct LSP between the ingress and egress edge nodes and assigning the new direct LSP to the traffic trunk associated with the low priority request if no multi-hop LSP has available bandwidth.

24. The system of claim 21 farther comprising, for each high priority request:

means for assigning a multi-hop LSP to the traffic trunk associated with the high priority request if no existing direct LSP has available bandwidth and a low priority traffic trunk cannot be rerouted from an existing direct LSP and it is acceptable for the traffic trunk associated with the high priority request to be assigned to a multi-hop LSP.

* * * * *